US012629730B2

(12) United States Patent
Imaoka

(10) Patent No.: US 12,629,730 B2
(45) Date of Patent: May 19, 2026

(54) CLEANING APPARATUS

(71) Applicant: SHIBAURA MECHATRONICS CORPORATION, Kanagawa (JP)

(72) Inventor: Yuichi Imaoka, Kanagawa (JP)

(73) Assignee: SHIBAURA MECHATRONICS CORPORATION, Kanagawa (JP)

( * ) Notice: Subject to any disclaimer, the term of this patent is extended or adjusted under 35 U.S.C. 154(b) by 323 days.

(21) Appl. No.: 18/371,121

(22) Filed: Sep. 21, 2023

(65) Prior Publication Data

US 2024/0100577 A1 Mar. 28, 2024

(30) Foreign Application Priority Data

Sep. 22, 2022 (JP) ................................ 2022-151470

(51) Int. Cl.

| | |
|---|---|
| ***B08B 7/04*** | (2006.01) |
| ***B08B 1/12*** | (2024.01) |
| ***B08B 3/10*** | (2006.01) |
| ***B08B 11/02*** | (2006.01) |

(52) U.S. Cl.

CPC .................. *B08B 7/04* (2013.01); *B08B 1/12* (2024.01); *B08B 3/10* (2013.01); *B08B 11/02* (2013.01)

(58) Field of Classification Search

CPC ......... H01L 21/67046; H01L 21/68728; H01L 21/67051; H01L 21/68721; H01L 21/6838; B08B 11/02

See application file for complete search history.

(56) References Cited

U.S. PATENT DOCUMENTS 7,089,687 B2 * 8/2006 Parks ................ H01L 21/67034 34/380

FOREIGN PATENT DOCUMENTS

CN 112974324 A * 6/2021 ....... H01L 21/67046
JP 2002-170806 A 6/2002

* cited by examiner

*Primary Examiner* — Shay Karls

(74) *Attorney, Agent, or Firm* — Venjuris, P.C.

(57) ABSTRACT

According to one embodiment of the present disclosure, a cleaning apparatus includes a plurality of rollers that rotates a substrate in contact with an outer periphery of the substrate; a rotation mechanism including a motor that rotates the rollers about the rotation shaft; a cover interposed between the rollers and the rotation mechanism to cover the rotation mechanism; an ejection port provided in the cover and that ejects gas between the cover and the rollers; a negative pressure region provided in the cover on a side of the rotation mechanism and having a negative pressure lower than an atmospheric pressure outside the cover through exhaust; a liquid ejector that ejects a cleaning liquid onto the substrate; and a cleaning unit that brings the brush into contact with at least one surface of the substrate that is being rotated, thereby cleaning the surface of the substrate.

10 Claims, 7 Drawing Sheets

CLEANING APPARATUS

CROSS-REFERENCE TO RELATED APPLICATIONS

The present application is based on and claims priority from Japanese Patent Application No. 2022-151470, filed on Sep. 22, 2022, with the Japan Patent Office, the disclosure of which is incorporated herein in its entirety by reference.

TECHNICAL FIELD

The present disclosure relates to cleaning apparatus.

BACKGROUND

The manufacturing process of semiconductor devices may involve cleaning the surface of a semiconductor wafer serving as a substrate with a high degree of cleanliness. For example, the chemical mechanical polishing (CMP) has been used to planarize the substrate surface. However, the CMP will result in the adhesion of particles (hereinafter referred to as contaminants) including organic matter, metal-containing grinding chips, and slurry residue to the substrate surface.

Such contaminants may inhibit the formation of a flat film or cause a short circuit in circuit patterns, potentially leading to defects in the products. Thus, cleaning the substrate with a cleaning liquid is performed to remove these contaminants. The cleaning apparatus that employs a rotating brush to perform such cleaning has been known (see, e.g., Japanese Patent Laid-Open Publication No 2002-170806).

The cleaning apparatus drives the substrate to rotate and causes the rotating brush to move in a direction parallel to the substrate while being brought into contact with the surface of the substrate along with the cleaning liquid. As a result, the cleaning liquid lifts contaminants adhering to the surface of the substrate, and the brush expels the lifted contaminants outside the substrate, thereby achieving the cleaning over the entire substrate.

The substrate is held by a plurality of rollers along its outer periphery and rotates as the rollers are rotated in the same direction by a rotation mechanism. The rotation mechanism includes a rotation shaft connected to the roller and a motor that transmits driving force to the rotation shaft. The drive shaft of the motor itself may also employ as the rotation shaft. The inflow of the cleaning liquid into such a rotation mechanism may cause, for example, corrosion of the motor bearings, potentially resulting in a failure of the rotation mechanism. Thus, the cleaning apparatus is provided with a cover that encases the rotation mechanism, preventing any inadvertent entry of the cleaning liquid.

SUMMARY

In this regard, it is necessary to provide a predetermined gap between the rotating roller and the fixed cover to facilitate the roller to rotate. While undergoing the cleaning process, a cleaning liquid adhering to the rotating roller tends to be discharged outward due to centrifugal force, but in some cases the cleaning liquid may flow downward along the outer periphery of the roller, potentially infiltrating the rotation mechanism through the gap. Furthermore, the cleaning liquid supplied to the substrate comes into contact with the roller upon being discharged outward by centrifugal force, and may enter the rotation mechanism through the gap. Any intrusion of the cleaning liquid through the gap is bound to result in a failure of the rotation mechanism, as described above. Moreover, dusts may be generated from the driving part of the motor and discharged through the gap to be adhered to the substrate becoming a contamination source. That is, dusts are also the contamination source.

Embodiments presented in the present disclosure are to address the challenges described above and provide a cleaning apparatus capable of preventing the cleaning liquid from infiltrating into the rotation mechanism and ensuring that dusts occurring in the rotation mechanism do not adhere to the substrate.

An embodiment of the present disclosure provides a cleaning apparatus that includes a plurality of rollers configured to rotate a substrate in contact with the outer periphery of the substrate; a rotation mechanism configured to rotate the roller about a rotation shaft; a cover interposed between the roller and the rotation mechanism to cover the rotation mechanism; a ejection port provided in the cover to eject gas between the cover and the roller; a negative pressure region provided in the cover on the side of the rotation mechanism to maintain an internal pressure at a level lower than an external atmospheric pressure of the cover through exhaust; a clean liquid ejection unit configured to eject a cleaning liquid onto the substrate; and a cleaning unit configured to bring a brush into contact with at least one surface of the substrate being rotated to clean the surface of the substrate.

The cleaning apparatus according to the embodiments of the present disclosure is capable of preventing the cleaning liquid from infiltrating into the rotation mechanism and ensuring that dusts occurring in the rotation mechanism do not adhere to the substrate.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 6A is a side view illustrating a slit seamlessly formed over the entire outer circumference, and FIG. 6B is a side view illustrating a plurality of slits formed over the entire outer circumference.

DESCRIPTION OF EMBODIMENTS

In the following detailed description, reference is made to the accompanying drawings, which form a part thereof. The illustrative embodiments described in the detailed description, drawings, and claims are not meant to be limiting. Other embodiments may be utilized, and other changes may be made without departing from the spirit or scope of the subject matter presented here.

Figure 1:
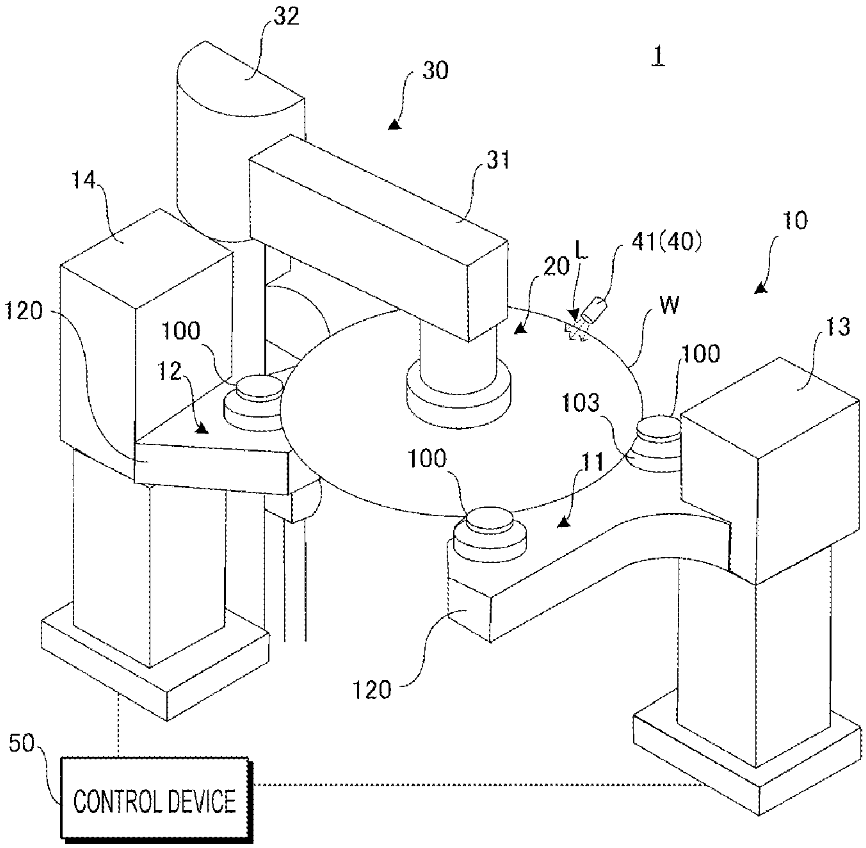
FIG. 1 is a perspective view illustrating a schematic configuration of cleaning apparatus according to an embodiment.

Hereinafter, embodiments of the present disclosure will be described with reference to the drawings. The present embodiment provides a cleaning apparatus 1 that cleans a substrate W using a cleaning liquid L and a brush 25 (see, e.g., FIGS. 3A and 3B) while rotating the substrate W, as illustrated in FIG. 1. The substrate W to be a cleaned is typically a semiconductor wafer but may be a substrate or similar board applied in display devices. The substrate W has a circular shape, featuring a beveled periphery. In other words, chamfering is performed through corner grinding.

<Configuration>

The cleaning apparatus 1 has a rotation drive unit 10, a cleaning unit 20, a brush drive unit 30, a cleaning liquid ejection unit 40, and a control device 50, as illustrated in FIG. 1.

(Rotation Drive Unit)

The rotation drive unit 10 rotates a plurality of rollers 100, thereby rotating the substrate W. The plurality of rollers 100 rotate the substrate W in contact with the outer periphery of the substrate W. The rotation drive unit 10 has a first holding unit 11, a second holding unit 12, a first drive unit 13, and a second drive unit 14. The first holding unit 11 and the second holding unit 12 are arranged at positions facing each other with the substrate W interposed.

Figure 2A:
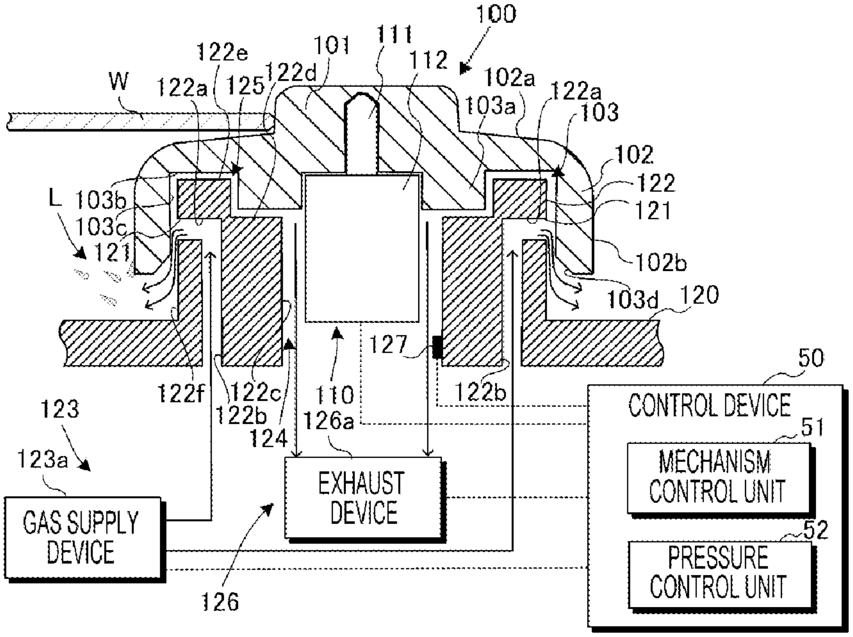
FIG. 2A is a cross-sectional view illustrating a roller and a cylindrical portion of a cover.

The first holding unit 11 and the second holding unit 12 each have a pair of rollers 100. The roller 100 is provided rotatably about an axis orthogonal to the substrate W. Each of the rollers 100 in the first holding unit 11 and the second holding unit 12 has a conveying portion 101, a base portion 102, and an accommodating portion 103, as illustrated in FIG. 2A. The conveying portion 101 rotates the substrate W while maintaining contact with the outer periphery of the substrate W (see, e.g., FIGS. 3B, 4B, and 5A to 5C). The conveying portion 101 has a columnar shape and holds the substrate W, with its side surface contacting the outer periphery of the substrate W.

The base portion 102 is concentric with the conveying portion 101 and has a columnar shape with a diameter expanded from the conveying portion 101. The base portion 102 has an inclined upper surface 102*a* positioned below the substrate W held by the conveying portion 101. The upper surface 102*a* forms an umbrella-like tapered surface with a conical side shape that rises from the outer peripheral side toward the conveying portion 101 over the entire outer circumference. The base portion 102 has a side surface 102*b* vertically erected. The side surface 102*b* has a curved portion, which is seamless with the upper surface 102*a*.

The accommodating portion 103 accommodates a cylindrical portion 122 of a cover 120 described later, as illustrated in FIG. 2A. The accommodating portion 103 is a columnar recess provided in the bottom part of the base portion 102 coaxially with the rotation shaft of the roller 100. The accommodating portion 103 has a convex portion 103*a* provided in the center of its ceiling. The convex portion 103*a* projects downward in an annular shape. The accommodating portion 103 also has an annular concave portion 103*b* formed around the convex portion 103*a*. The accommodating portion 103 has an inner wall 103*c* that is a cylindrical curved surface coaxial with the rotation shaft of the roller 100. The accommodating portion 103 also has an inclined surface 103*d* chamfered to create a widened profile outward at the inner corner of its lower end.

The roller 100 is made of a material that exhibits resistance to the cleaning liquid L, including but not limited to PCTFE, PEEK, and similar substances. Of these, PCTFE is particularly preferable due to its exceptional abrasion resistance and minimal particle generation upon contact with the substrate W.

As illustrated in FIG. 1, the first drive unit 13 and the second drive unit 14 provide support to the first holding unit 11 and the second holding unit 12, respectively. The first drive unit 13 and the second drive unit 14 rotate their respective rollers 100 about their shaft of rotation. The first drive unit 13 and the second drive unit 14 move their respective rollers 100 in the direction of contacting and separating from the substrate W. The first drive unit 13 and the second drive unit 14 are therein provided with a rotation mechanism 110 and the cover 120.

The rotation mechanism 110 rotates the roller 100 about a rotation shaft 111. One possible configuration for the rotation mechanism 110 involves employing a motor 112 with the rotation shaft 111 serving as its drive shaft. In other words, each roller 100 is connected to the drive shaft of the motor 112 at the center of its lower part, and rotates through the operation of the motor 112. The motor 112 is securely affixed to a support (not illustrated) and has a vertically oriented drive shaft directed upward.

The cover 120 is a member interposed between the roller 100 and the rotation mechanism 110 to cover the rotation mechanism 110, as illustrated in FIG. 2A. The cover 120 is partitioned into two sections: one covers the rotation mechanism 110 corresponding to the pair of rollers 100 of the first holding unit 11, while the other covers the rotation mechanism 110 corresponding to the pair of rollers 100 of the second holding unit 12 (see, e.g., FIG. 1).

Figure 2B:
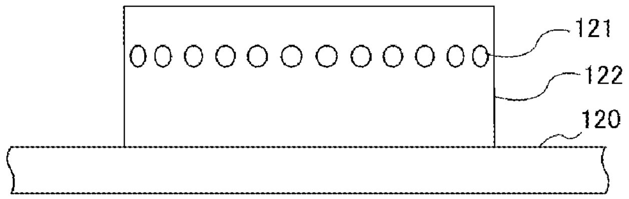
FIG. 2B is a side view illustrating a ejection port.

The cover 120 is a container that defines a closed space accommodating the rotation mechanism 110. The cover 120 is provided with an ejection port 121 configured to ejection gas between the cover 120 and the roller 100. More specifically, the cover 120 has the cylindrical portion 122 that surrounds the rotation shaft 111 and the motor 112, as illustrated in FIG. 2B. The cylindrical portion 122 has a shape protruding in the vertical direction from the horizontal surface of the cover 120. The cylindrical portion 122 is provided with the ejection port 121 configured in a form of multiple holes. The ejection port 121 is provided along the outer periphery of the cylindrical portion 122. Specifically, the multiple holes of the ejection port 121 are provided at the same height and at regular intervals throughout the outer circumference of the cylindrical portion 122. The respective holes of the ejection port 121 communicate with each other through an annular ejection passage 122*a* within the cylindrical portion 122. As described later, the outer periphery of the cylindrical portion 122, or the ejection port 121 provided along the outer periphery of the cylindrical portion 122 is covered with the side surface 102*b* of the base portion 102 of the roller 100, with a small gap in between.

The interior of the cylindrical portion 122 is provided with a gas supply passage 122*b*. The gas supply passage 122*b* has a lower end that opens into the interior of the cover 120 and an upper end that communicates with the ejection passage 122*a*. The gas supply passage 122*b* is connected to a gas supply unit 123 at its lower end. The gas supply unit 123 includes a gas supply device 123*a* that supplies gas. The gas supply unit 123 is connected to the gas supply passage 122*b* via a valve-equipped pipe (not illustrated). Examples of gas include rare gases, such as $N_2$. A clean filter is provided in the middle of the pipe to ensure the delivery of purified gas. Supplying gas from the gas supply unit 123 enables the gas to be blown outward from the ejection port 121 through the gas supply passage 122*b* and the ejection passage 122*a*, preventing the cleaning liquid L from entering through the gap between the cover 120 and the roller 100. The gas supply rate may be set to, for example, 5 L/min to 10 L/min. The gas supply passage 122*b* may be provided at a plurality of locations. In one example, having two opposing points across the rotation shaft 111 or evenly distributing three or more points along the circumferential direction may facilitate the even distribution of gas throughout the entire outer circumference.

The cover 120 has a negative pressure region 124 provided in the cover 120 on the side of the rotation mechanism 110. The negative pressure region 124 is a region where the internal pressure is lower than the barometric pressure outside the cover 120 due to exhaust by an exhaust unit 126, which will be described later. More specifically, the motor 112 of the rotation mechanism 110 is inserted into an inside of an inner peripheral wall 122*c* of the cylindrical portion 122 in a non-contact manner, thereby forming a gap between the cylindrical portion 122 and the rotation mechanism 110. The gap constitutes the negative pressure region 124. In the present embodiment, the negative pressure region 124 communicates with the interior of the cover 120, and thus, the interior of the cover 120 also becomes negatively pressurized.

At the top of the cylindrical portion 122, a columnar concave portion 122*d* is provided to be centrally depressed, and an annular convex portion 122*e* is formed around the concave portion 122*d*. The rotation shaft 111 is exposed through an opening inside the top of the cylindrical portion 122. The lower portion of the roller 100 is connected to the rotation shaft 111 to cover this opening.

This configuration allows the cylindrical portion 122 to be accommodated in the accommodating portion 103 of the roller 100 while maintaining a gap between them. In other words, to ensure the rotation of the roller 100, the roller 100 is supported in a manner that maintains noncontact between the cylindrical portion 122 and the roller 100, thus enabling the flow of gas through the gap separating the both. Between the concave portion 122*d* of the cylindrical portion 122 and the convex portion 103*a* of the roller 100 and between the convex portion 122*e* of the cylindrical portion 122 and the concave portion 103*b* of the roller 100, a ventilation pathway 125 having a bent labyrinthine structure is formed.

This ventilation pathway 125 is positioned between the negative pressure region 124 and the ejection port 121 of the cylindrical portion 122 and communicates with the ejection passage 122*a* formed between the inner wall 103*c* of the accommodating portion 103 and an outer peripheral wall 122*f* of the cylindrical portion 122. The ejection port 121 is situated higher than the lower end of the accommodating portion 103. In other words, the lower end of the ejection port 121 is situated higher than the lower end of the side surface 102*b*. It is advisable that the lower end of the ejection port 121 is positioned higher than one-third of the height of the accommodating portion 103 from the lower end of the accommodating portion 103.

The exhaust unit 126 is connected to the negative pressure region 124. The exhaust unit 126 includes an exhaust device 126*a* configured to draw and expel gas, with its connection to the negative pressure region 124 established through a valve-equipped pipe (not illustrated). The exhaust device 126*a* may employ apparatus such as an exhaust pump or CONVUM (a registered trademark). Further, the exhaust unit 126 channels the exhaust gas to the factory-side exhaust facility. In other words, the gas within the negative pressure region 124 is vented out to the factory-side exhaust facility. In addition, within the negative pressure region 124 or the cover 120 that communicates therewith, a pressure detector 127 is provided to detect the pressure in the negative pressure region 124. The pressure detector 127 may employ a differential pressure gauge capable of detecting pressure differentials between the interior and exterior of the cover 120.

The first drive unit 13 and the second drive unit 14 are configured to be movable in the direction of contacting and separating from the substrate W, as described above. In other words, a drive mechanism (not illustrated) is provided at the lower end of each of the first drive unit 13 and the second drive unit 14. The drive mechanism allows the first drive unit 13 and the second drive unit 14 to move in the direction of contacting and separating with the substrate W. This configuration enables the first holding unit 11 and the second holding unit 12 also move in the direction of contacting and separating from the substrate W. In one example, as the drive mechanism, a rotary cylinder may be employed, which moves the drive shafts provided at the lower ends of the first drive unit 13 and the second drive unit 14 in opposite directions along a direction parallel to the surface of the substrate W.

Figure 3A:
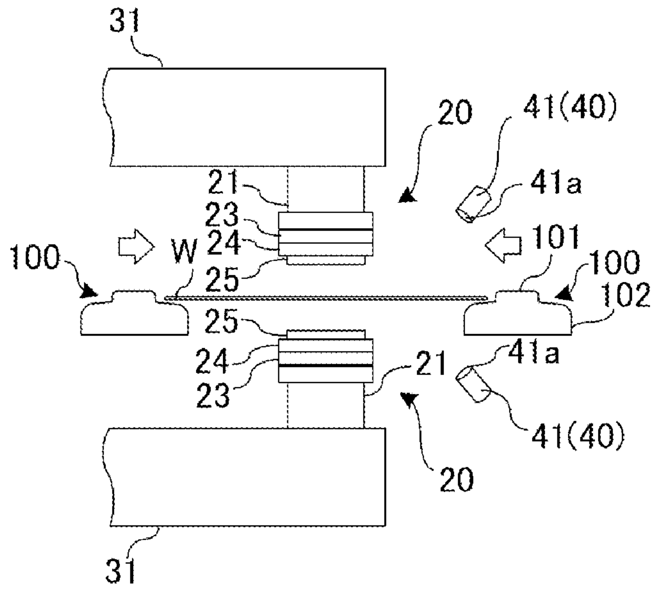
FIG. 3A is a side view illustrating the roller in a release location.
Figure 3B:
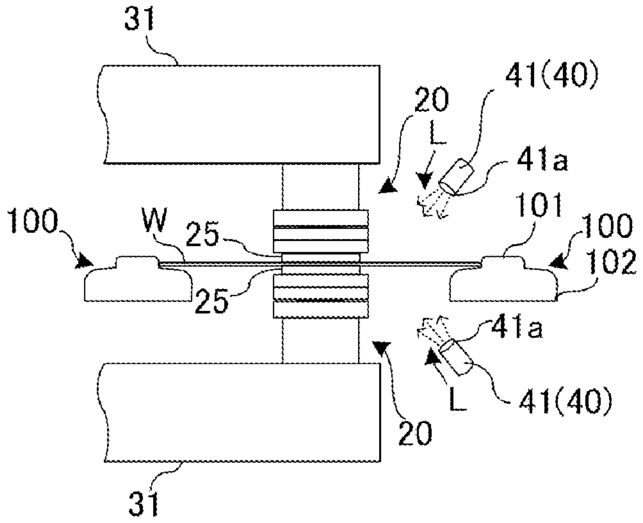
FIG. 3B is a side view illustrating the roller in a holding location.
Figure 4A:
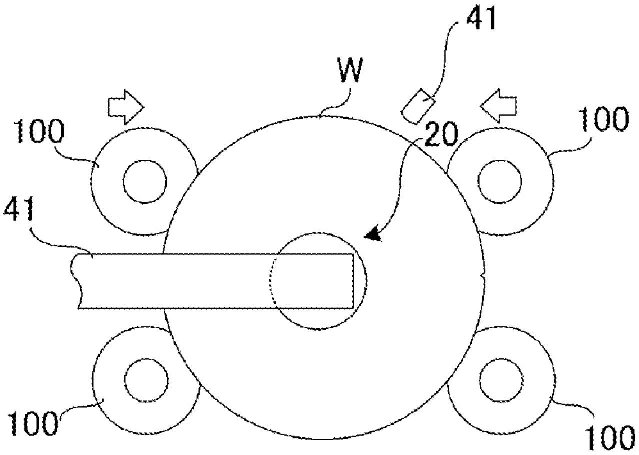
FIG. 4A is a plan view illustrating the roller in the release location.
Figure 4B:
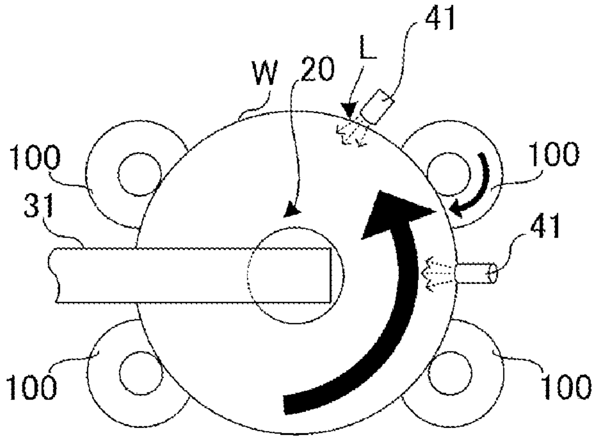
FIG. 4B is a plan view illustrating the roller in the holding location.

The drive mechanism moves the first holding unit 11 and the second holding unit 12 in a direction that causes them to separate from each other, resulting in the conveying portion 101 of the roller 100 reaching a separation location, i.e., a release location, away from the substrate W, as illustrated in FIGS. 3A and 4A. The drive mechanism moves the first holding unit 11 and the second holding unit 12 in a direction that causes them to approach, resulting in the conveying portion 101 of the roller 100 reaching a contact position, i.e., a retain position, coming into contact with the substrate W, as illustrated in FIGS. 3B and 4B. In FIGS. 3A and 3B, a pair of opposing rollers 100 are depicted as being arranged along the left-right direction. Other rollers 100 are omitted from the illustration.

(Cleaning Unit)

The cleaning unit 20 cleans the surface of the substrate W while bringing the rotating brush 25 into contact with the surface of the substrate W being rotated. The term "contact" used herein includes both instances where the brush 25 directly touches the surface and where the cleaning liquid L intervenes to establish contact. The cleaning unit 20 has a body portion 21, a brush holder 23, a support 24, and the brush 25, as illustrated in FIG. 3A. The body portion 21 is a container of a cylindrical shape and accommodates a motor (not illustrated) inside. The motor serves as the driving source that rotates the brush 25.

The brush holder 23 is attached to the drive shaft of the motor and is a disc-shaped member to which the support 24 is detachably provided. The brush holder 23 is provided rotatably independently of the body portion 21. The support 24 is a disc-shaped component to which the brush 25 is fixed, and which is attached to and detached to the brush holder 23 by a chuck mechanism or similar means.

The brush 25 is a columnar component constituted using a material with flexibility and elasticity. In the present embodiment, the brush 25 employs a spongy-like resin such as PVA (nylon-based resin) or PTFE (fluorine-based resin). A similar resin-made bristle brush may also be employed. In other words, examples of the brush 25 according to the present embodiment include variations with sponge-like clusters as well as those densely populated with numerous filament-like structures. The brush 25 configured with a sponge-like cluster includes variations where multiple fiber bodies are densely packed to form a cluster. Additionally, the number of the brushes 25 provided on the support 24 may be singular or multiple.

(Brush Drive Unit)

As illustrated in FIG. 1, the brush drive unit 30 moves the cleaning unit 20 in the direction of contacting or separating from the surface of the substrate W and the direction parallel to the surface of the substrate W. The brush drive unit 30 has an arm 31 and a drive mechanism 32. The arm 31 is a component extending parallel to the substrate W and has one end to which the cleaning unit 20 is attached. The drive mechanism 32 has a swinging mechanism and an elevating mechanism.

Figure 5A:
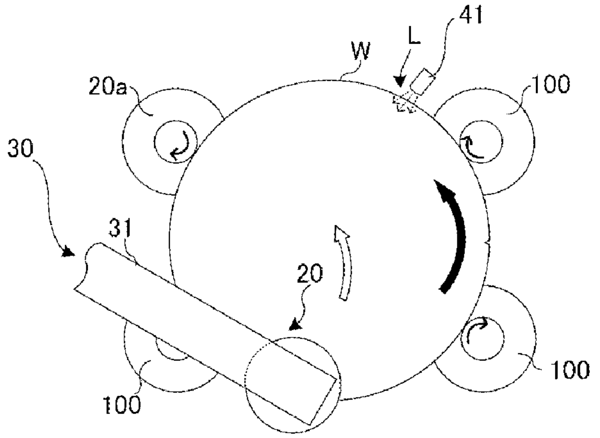
FIG. 5A is a plan view illustrating a cleaning unit at the start position of cleaning.
Figure 5B:
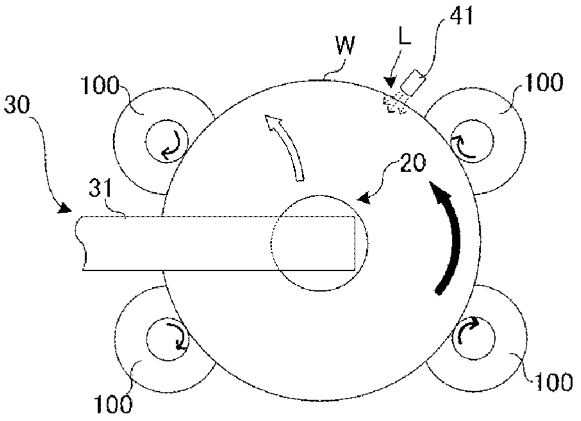
FIG. 5B is a plan view illustrating the cleaning unit during cleaning.
Figure 5C:
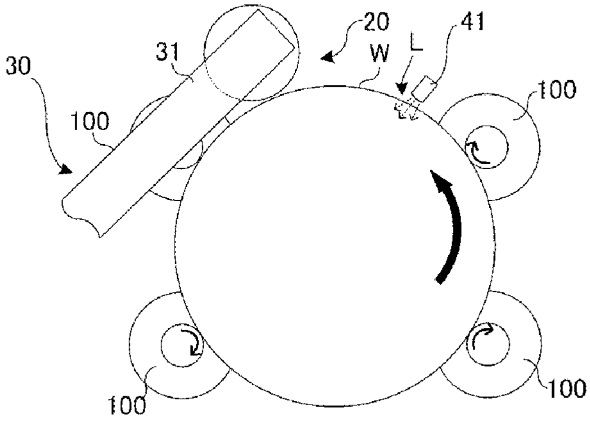
FIG. 5C is a plan view illustrating the cleaning unit at the end position.

As illustrated in FIGS. 5A to 5C, the swinging mechanism moves the arm 31 back and forth in a trajectory of an arc with its opposite end from the cleaning unit 20 as the axis, spanning from the outer periphery on one side of the substrate W to the outer periphery on the opposite side, while remaining parallel to the substrate W. The swinging mechanism has a support shaft extending from the arm 31 in the direction orthogonal to the plane of the substrate W and a motor (not illustrated) serving as the driving source for swinging the support shaft. The arm 31 is positioned at a standby position (not illustrated) outside the periphery of the substrate W when the substrate W is not being cleaned. Additionally, the swinging mechanism moves the arm 31 back and forth from the standby position to the outer periphery of the substrate W.

The elevating mechanism moves the arm 31 in the direction of causing the cleaning unit 20 to come into contact with and separate from the substrate W, as illustrated in FIGS. 3A and 3B. As the elevating mechanism, a ball screw mechanism or a cylinder, among others, may be employed to raise or lower the support shaft of the arm 31.

(Cleaning Liquid Ejection Unit)

The cleaning liquid ejection unit 40 ejects the cleaning liquid L onto the substrate W. The cleaning liquid ejection unit 40 has a nozzle 41. The cleaning liquid L is ejected from an ejection outlet 41*a* at the tip of the nozzle 41 toward both surfaces of the substrate W being rotated (see, e.g., FIG. 3B). In the present embodiment, the cleaning liquid L may be ozone water, pure water, SC-1 (a cleaning liquid of a mixture of ammonia water and hydrogen peroxide), or an acid-based chemical liquid (such as hydrofluoric acid, nitric acid, or hydrochloric acid). In one example, in using a PVA brush 25, cleaning is performed with pure water. Meanwhile, for a PTFE brush 25, ozone water, SC-1, or an acid-based chemical liquid is used. Due to its liquid resistance, PTFE may be used in combination with the cleaning liquid L, such as ozone water, SC-1, or an acid-based chemical liquid.

The nozzle 41 is a pair of cylindrical structures provided above and below the substrate W, which is interposed therebetween. The nozzle 41 has one end bent, for example, at a 45-degree angle relative to the surface of the substrate W. This end has the ejection outlet 41*a* configured to expel the cleaning liquid L toward the surface of the substrate W. The nozzle 41 ejects from the outside of the substrate W toward the near-central region of the surface of the substrate W, that is, toward the middle of the movement path of the brush 25 in a spraying manner.

The nozzle 41 has the other end connected to a non-illustrated supply device that supplies the cleaning liquid L via a pipe. The supply device has a liquid delivery system that is connected to a pure water production apparatus (pure water storage tank), an ozone water production apparatus (ozone water storage tank), an SC-1 supply device or acid-based chemical liquid supply device, a valve, and other components, thus enabling the supply of either pure water, ozone water, SC-1, or an acid-based chemical liquid to be switched as needed.

The cleaning unit 20, the brush drive unit 30, and the cleaning liquid ejection unit 40 as described above are each provided in pairs, with one located on the side of the upper surface and the other on the side of the lower surface of the substrate W interposed, as illustrated in FIGS. 3A and 3B. This configuration enables the cleaning of both the upper and lower surfaces (also referred to as the front surface and the back surface) of the substrate W. Specifically, the pair of arms 31 of the brush drive units 30 are positioned above and below the substrate W so that the brushes 25 and the ejection outlets 41*a* face the substrate W. The driving mechanism 32 moves the pair of arms 31 between a contact location where the pair of brushes 25 are in contact with the substrate W interposed therebetween (FIG. 3B) and a separation location (FIG. 3A) where the pair of brushes 25 are separated from the substrate W.

Further, the driving mechanism 32 swings the pair of arms 31 to displace the pair of brushes 25 positioned at the contact location, following an arc trajectory, as illustrated in FIGS. 5A to 5C. When viewed from above, the contact location is the starting point at which the brush 25 begins swinging, as illustrated in FIG. 5A, while the separation location is the endpoint at which the brush 25 ceases its swing, as illustrated in FIG. 5C. Furthermore, the contact location lies on the outer periphery of the substrate W, while the separation location is situated on the opposite outer periphery of the substrate W from the contact location.

(Control Device)

The control device 50 exercises individual control over the components of the cleaning apparatus 1. The control device 50 has a processor for program execution, a memory for storing a range of information including programs and operational parameters, and a drive circuit for actuating each component, thus implementing various functions of the cleaning apparatus 1. Specifically, the control device 50 controls the rotation drive unit 10, the cleaning unit 20, the brush drive unit 30, the cleaning liquid ejection unit 40, and similar components. Additionally, the control device 50 may incorporate an input device for information entry and a display device for information presentation.

In the present embodiment, the control device 50 has a mechanism control unit 51 and a pressure control unit 52, as illustrated in FIG. 2A. The mechanism control unit 51 controls the actuation of various components including the rotation mechanism 110, the gas supply unit 123, the exhaust unit 126, the first and second drive units 13 and 14, the motor for rotating the brush 25, the drive mechanism 32 of the brush drive unit 30, and the cleaning liquid supply device. The pressure control unit 52 controls the exhaust unit 126 in such a way that the negative pressure region 124 maintains a predetermined negative pressure value depending on a detection result obtained by the pressure detector 127. In one example, it is recommended to set the pressure in the negative pressure region 124 (internal pressure of the cover 120) within the range of 0 to −1 Pa. The term "pressure" used herein refers to gauge pressure with reference to barometric pressure. The pressure control may be achieved by controlling the exhaust flow rate of the exhaust unit 126 using a valve or similar means.

<Operation>

The operation of the cleaning apparatus 1 configured as mentioned above is now described.

(Substrate Loading)

First, the loading operation for the substrate W will be described. Specifically, in the previous process, ozone water is applied to the surface of the processed substrate W to form an oxide film, rendering it hydrophilic. The surface of the substrate W on which the oxide film is formed, is covered with organic contaminants (such as slurries) and metallic contaminants that remain from the CMP process, which is the process prior to the previous process. This means that ozone water is supplied while contaminants remain on both surfaces of the substrate W, that is, that the oxide film is formed while contaminants are attached. Though ozone water has the ability to remove organic substances, the aforementioned previous process is not intended to remove organic substances but is primarily focused on hydrophilizing the front and back surfaces of substrate W.

A transfer robot unloads the substrate W from the previous process, conveys it to the cleaning apparatus 1, and loads it between the rollers 100 of the first holding unit 11 and the second holding unit 12, as illustrated in FIGS. 3A and 4A. The loaded substrate W is placed on the upper surface 102*a* of the roller 100. The first holding unit 11 and the second holding unit 12 move toward each other, as illustrated in FIGS. 3B and 4B. As a result, the four rollers 100 move toward the substrate W, causing the incline of the upper surface 102*a* of the base portion 102 to lift the outer periphery of the substrate W, and the side of the conveying portion 101 comes into contact with the outer periphery of the substrate, thereby holding the substrate W.

(Substrate Cleaning)

Next, the cleaning operation for the substrate W will be described. As illustrated in FIG. 4B, the roller 100 rotates clockwise, causing the substrate W to begin rotating counterclockwise, as illustrated in this figure. In this figure, the black arrow indicates the direction of rotation of the substrate W. For example, the substrate W rotates at a low speed of 20 to 60 rpm. In the case where the side surface of the conveying portion 101 of the roller 100 is in contact with the outer periphery of the substrate W, as illustrated in FIG. 2A, the rotation of the roller 100 is transmitted to the substrate W, maintaining the rotation of the substrate W.

Simultaneously with the initiation of rotation of the roller 100, the exhaust by the exhaust unit 126 begins, and the gas supply by the gas supply unit 123 also begins. The timing for commencing exhaust is set to occur either until the rotation of the roller 100 begins or until the substrate W is held, coinciding with the moment when the negative pressure acts upon the ventilation pathway 125. The beginning of the exhaust allows the negative pressure region 124 to be negative in pressure, thus preventing dust particles occurring in the motor 112 of the rotation mechanism 110 from being ejected outside the roller 100 through the ventilation pathway 125. Furthermore, the gas from the gas supply unit 123 is ejected from the ejection port 121 through the ejection passage 122*a*, and the gas flows out from the lower end of the roller 100.

In this regard, if the sole intention is to prevent the intrusion of the cleaning liquid L into the inside of the cover 120, it is sufficient to eject the gas from the gas supply device 123*a* through the ejection port 121. However, by ejecting gas from the ejection port 121, a force is exerted to draw the gas from the ventilation pathway 125 to the outside, leading to a flow that expels the atmosphere inside the cover 120 (including dust generated by the motor) to the outside through the gap between the cover 120 and the roller 100. In the present embodiment, to suppress this phenomenon, as described above, the suction force acts on the interior of the cover 120 by the exhaust from the exhaust device 126*a* of the exhaust unit 126, thus preventing the expulsion of the internal atmosphere of the cover 120 through the ventilation pathway 125, which is the gap between the roller 100 and the cover 120. The pressure value of the negative pressure region 124 is set to 0 Pa to −1 Pa, as described above. This pressure is maintained by gas discharged from the gap between the roller 100 and the cover 120 by the gas supply device 123*a*, ensuring that the internal atmosphere of the cover 120 is not discharged to the outside.

The upper and lower arms 31 initially remain in standby positions outside the substrate W. The upper and lower arms 31 in the standby positions are swung up to the outer periphery of the substrate W while rotating the brush 25 by the motor, coming to a halt momentarily, as illustrated in FIG. 5A. Subsequently, the upper and lower arms 31 move in the direction approaching the substrate W, causing the upper and lower brushes 25 of the cleaning unit 20 to come into contact with the front and back surfaces of the substrate W, sandwiching the substrate W, as illustrated in FIG. 3B.

The rotation of the upper and lower arms 31 induces a horizontal motion of the upper and lower brushes 25. In this event, the ejection outlet 41*a* of the nozzle 41 is discharging the cleaning liquid L, resulting in a flow of the cleaning liquid L between the brush 25 and the substrate W. Specifically, as illustrated in FIGS. 5A and 5B, the brush 25, which initiates movement from one side of the outer periphery of the substrate W, moves along the arc trajectory indicated by the white arrow in the figure, concurrently pushing contaminants along with the cleaning liquid L toward the outer periphery of the substrate W.

In this event, the cleaning liquid L is also applied to the roller 100, but as described above, the intrusion of the cleaning liquid L into the rotation mechanism 110 within the roller 100 is prevented due to the gas flowing out from the lower end of the roller 100. In the case where the brush 25 passes over the other side of the outer periphery of the substrate W and separates from the substrate W, as illustrated in FIG. 5C, the brush 25 halts its rotation, and the ejection of the cleaning liquid L from the ejection outlet 41*a* is stopped, marking the completion of the cleaning process. Subsequently, the exhaust from the exhaust unit 126 is halted, along with the cessation of gas supply from the gas supply unit 123.

Moving the upper and lower arms 31 away from each other causes the upper and lower brushes 25 to be separated from the front surface and the back surface of the substrate W. Furthermore, the arms 31 retreat to the standby position outside the outer periphery of the substrate W through their swinging. After that, the aforementioned process may be repeated to perform multiple cleaning actions by the brush 25. In this case, the arm 31 returns to the initial cleaning position after each cleaning cycle (see, e.g., FIG. 5A).

(Effects)

(1) According to the present embodiment as described above, the cleaning apparatus 1 includes the plurality of rollers 100, the rotation mechanism 110, the cover 120, the ejection port 121, the negative pressure region 124, the cleaning liquid ejection unit 40, and the cleaning unit 20. The roller 100 rotates the substrate W in contact with the outer periphery of the substrate W. The rotation mechanism 110 rotates the roller 100 about the rotation shaft 111. The cover 120 is interposed between the roller 100 and the rotation mechanism 110 to cover the rotation mechanism 110. The ejection port 121 is provided in the cover 120 to ejection gas between the cover 120 and the roller 100. The negative pressure region 124 is provided in the cover 120 on the side of the rotation mechanism 110 and having a negative pressure lower than an atmospheric pressure outside the cover 120 through exhaust. The clean liquid ejection unit 40 ejects the cleaning liquid L onto the substrate W. The cleaning unit 20 brings the brush 25 into contact with at least one surface of the substrate W being rotated, thereby cleaning the surface of the substrate W.

These configurations enable the gas ejected from the ejection port 121 to prevent the cleaning liquid L from entering the rotation mechanism 110. Consequently, this hinders the cleaning liquid L from splashing onto the rotation mechanism 110, thus preventing the failure of the motor 112. In addition, forming the negative pressure region 124 enables the gas ejected from the ejection port 121 to prevent the ambient atmosphere around the rotation mechanism 110, specifically the dust occurring in the rotation mechanism 110, from being discharged outward the cover 120 along with the gas ejected from the ejection port 121 through the ventilation pathway 125, thus maintaining a clean environment in the substrate W and the cleaning apparatus 1.

(2) The ejection port 121 may be in a form of a plurality of holes. This configuration may prevent the intrusion of the cleaning liquid L from several locations.

(3) The cover 120 is provided between the roller 100 and the rotation mechanism 110. The cover 120 has the cylindrical portion 122 surrounding the rotation shaft 111. The roller 100 has the accommodating portion 103 with the open lower end for accommodating the cylindrical portion 122. The ejection port 121 is provided above the lower end of the accommodating portion 103. These configurations enable the gas regulated downward against the interior of the accommodating portion 103 of the roller 100, especially against the inner wall 103*c*, to flow out from the lower end, so this gas blowout prevents the reattachment of cleaning liquid L to the substrate W. Although some of the gas that hits the inner wall 103*c* of the roller 100 may potentially flow upward into the ventilation pathway 125, the flow of gas discharged from the lower end prevents the intrusion of the cleaning liquid L from external sources. Thus, there is no challenge even if the gas flows from the ejection port 121 into the ventilation path 125.

(4) The ventilation pathway 125 of a bent labyrinthine structure is provided between the negative pressure region 124 and the ejection port 121. This configuration enables the flow of gas between the negative pressure region 124 and the ejection port 121 to be restricted, reducing the mutual influence between the negative pressure of the negative pressure region 124 and the gas ejection from the ejection port 121.

(5) The cleaning apparatus 1 has the exhaust unit 126, the pressure detector 127, and the pressure control unit 52. The exhaust unit 126 performs exhaustion from the negative pressure region 124. The pressure detector 127 detects a pressure in the negative pressure region 124. The pressure control unit 52 controls the exhaust unit 126 to maintain the negative pressure of the predetermined value in the negative pressure region 124 relative to the outside of the roller 100 depending on a detection result obtained by the pressure detector 127. These configurations enable the negative pressure of the negative pressure region 124 to be maintained even with the ejection of gas from the ejection port 121, preventing the ejection of dust along with the gas expelled from the ejection port 121 through the ventilation pathway 125.

(Modifications)

The present embodiments are not limited to the exemplary aspects mentioned above, and the following modifications may also be implemented.

Figure 6A:
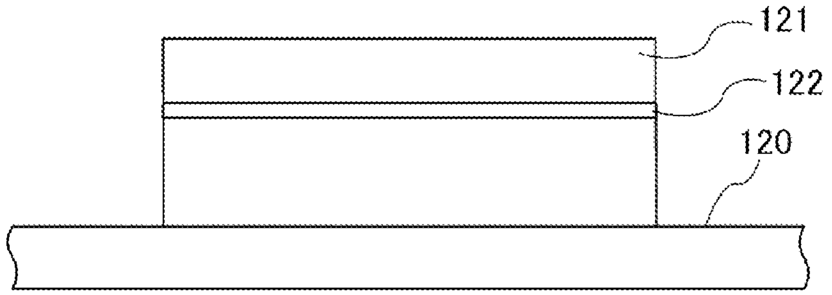
FIGS. 6A and 6B illustrate a modification in which the ejection port according to an embodiment is configured as a slit.
Figure 6B:
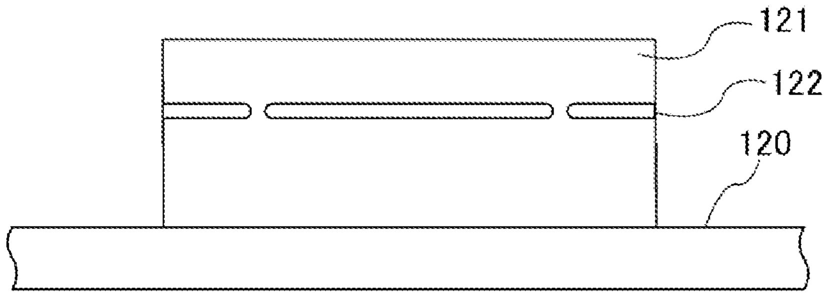

(1) The ejection port 121 may be in a form of a slit. The slit may be a horizontally elongated narrow opening, extending seamlessly around the entire outer circumference of the cylindrical portion 122, as illustrated in FIG. 6A. Alternatively, the slit may be formed in multiple segments along the entire outer circumference of the cylindrical portion 122, as illustrated in FIG. 6B. This configuration enables a more uniform ejection of gas within the roller 100, preventing the intrusion of the cleaning liquid L throughout the entire outer circumference of the roller 100.

Figure 7:
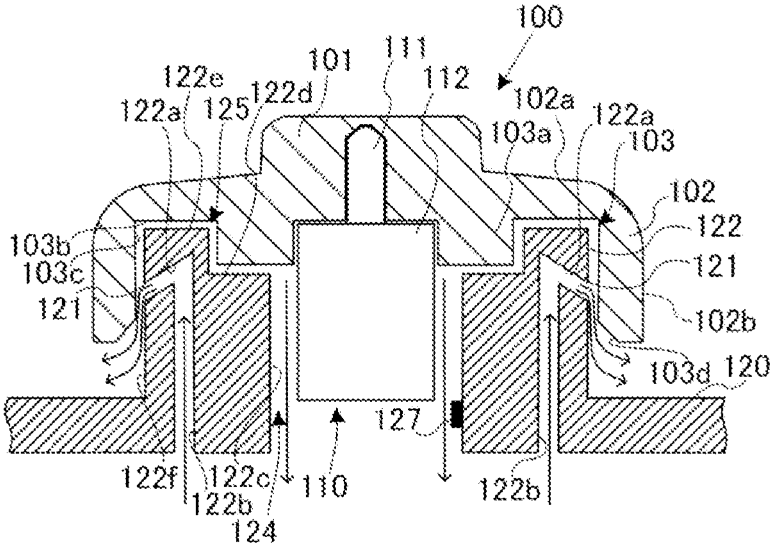
FIG. 7 is a cross-sectional view illustrating a modification in which an ejection passage is inclined.

(2) The ejection passage 122*a* provided in the cover 120 may be a downward-sloping gas passage that directs the gas flow toward the ejection port 121. In one example, as illustrated in FIG. 7, the ejection passage 122*a*, which communicates the ejection port 121 and the gas supply passage 122*b*, may be configured with a sectional profile that slopes downward towards the outside. This configuration facilitates the gas flow to be directed downward along the inner wall 103*c* of the roller 100, preventing the intrusion of cleaning liquid L due to gas flow towards the negative pressure region 124. The ejection passage 122*a* may be inclined relative to the horizontal, for example, at an inclination angle of approximately 45°.

Directing the predominantly downward flow of gas supplied from the ejection port 121 may cause concern about the possibility of generating negative pressure on the ventilation pathway side due to the suction force of the gas. To address this issue, for instance, it is sufficient that the pressure control unit 52 may adjust the exhaust volume through the exhaust unit 126 to prevent the dust occurring in the rotation mechanism 110 in the negative pressure region 124 from leaking externally.

Figure 8:
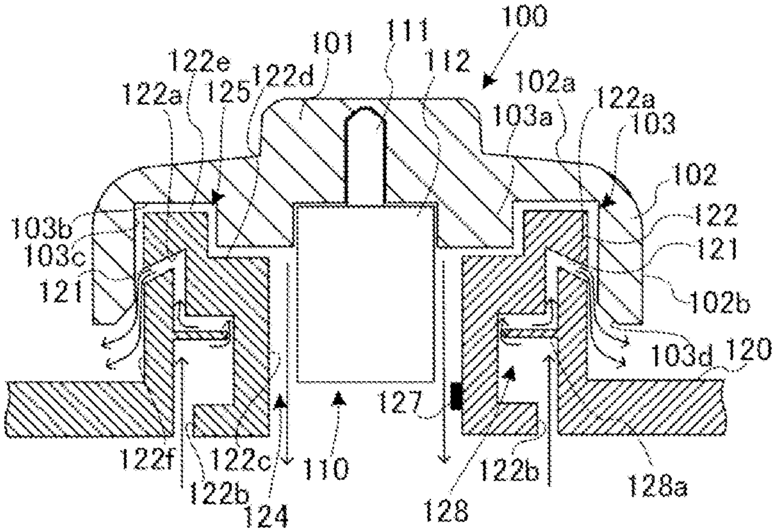
FIG. 8 is a cross-sectional view illustrating a modification in which a buffer region is provided in the ejection passage.

(3) The cover 120 may be provided with a buffer region 128 that communicates with the ejection port 121 and retains gas before being ejected from the ejection port 121. In one example, as illustrated in FIG. 8, the buffer region 128 is formed by expanding the gas supply passage 122*b* and providing a rectifying plate 128*a* that obstructs gas flow while providing the gap communicating with the ejection port 121 therein. This configuration enables the supplied gas to be pressurized by the buffer region 128 before being forcefully ejected from the ejection port 121. Furthermore, by maintaining the buffer region 128 as a continuous ring-shaped area, the gas may be uniformly and strongly ejected over the entire outer circumference. In addition, gas accumulation within the buffer region 128 ensures a stable supply of gas from the buffer region 128 to the ejection port 121. This stabilizes the gas ejection rate from the ejection port 121 across the entire outer circumference. This makes it possible to stabilize the amount of gas ejected from the ejection port 121 over the entire outer circumference.

(4) The rotation mechanism 110 may also be configured as a belt drive mechanism. Specifically, belts for transmitting the driving force are provided between the drive shaft of the motor 112, which is the driving source, and the pulley provided on the drive shaft of one roller 100, and between the pulleys provided on the drive shafts of the pair of rollers 100, respectively. With the belts, the pair of rollers 100 may be rotatably provided by the driving source.

(5) The number of rollers 100 that rotate the substrate W is not limited to the above-mentioned embodiments. Moreover, the configuration of the cleaning unit 20 is not restricted to the above-mentioned embodiments. In one example, a configuration where only one surface of the substrate W is cleaned with the brush 25 is implementable. A configuration in which a cylindrical brush 25 with an axis parallel to the surface of the substrate W is employed, and the side of the brush 25 is brought into contact with the substrate W for cleaning is also acceptable.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A cleaning apparatus comprising:

a plurality of rollers configured to rotate a substrate in contact with an outer periphery of the substrate;

a rotation mechanism including a motor and configured to rotate the rollers about a rotation shaft;

a cover having a cylindrical portion provided between the rollers and the rotation mechanism to cover the rotation mechanism, the cylindrical portion surrounding the rotation shaft;

an ejection port provided along an outer periphery of the cylindrical portion and configured to eject gas between the cover and the rollers;

a negative pressure region provided in the cover on a side of the rotation mechanism and having a negative pressure lower than an atmospheric pressure outside the cover through exhaust;

a liquid ejector configured to eject a cleaning liquid onto the substrate; and a cleaning unit including a brush configured to bring the brush into contact with at least one surface of the substrate that is being rotated, thereby cleaning the surface of the substrate.

2. The cleaning apparatus according to claim 1, wherein the ejection port is configured as a plurality of openings.

3. The cleaning apparatus according to claim 1, wherein the ejection port is configured as a slit.

4. The cleaning apparatus according to claim 1, wherein the cover is provided with a buffer region communicating with the ejection port, the buffer region retaining the gas before being ejected from the ejection port.

5. The cleaning apparatus according to claim 1, wherein the cover has a cylindrical portion provided with the ejection port and surrounding the rotation shaft, the roller has an accommodating portion with a lower end open for accommodating the cylindrical portion, and the ejection port is provided above the lower end of the accommodating portion.

6. The cleaning apparatus according to claim 1, wherein the cover has an airflow passage through which the gas flows, the airflow passage being inclined downward towards the ejection port.

7. The cleaning apparatus according to claim 1, wherein a ventilation pathway with a bent labyrinthine structure is provided between the negative pressure region and the ejection port.

8. The cleaning apparatus according to claim 1, further comprising:

an exhauster configured to perform exhaustion from the negative pressure region;

a pressure detector configured to detect a pressure in the negative pressure region; and a pressure controller configured to control the exhaust to maintain a negative pressure of a predetermined value in the negative pressure region relative to an outside of the roller according to a detection result obtained by the pressure detector.

9. A cleaning apparatus comprising:

a plurality of rollers configured to rotate a substrate in contact with an outer periphery of the substrate;

a rotation mechanism including a motor and configured to rotate the rollers about a rotation shaft;

a cover interposed between the rollers and the rotation mechanism to cover the rotation mechanism;

an ejection port provided in the cover and configured to eject gas between the cover and the rollers, the ejection port being configured as a plurality of openings;

a negative pressure region provided in the cover on a side of the rotation mechanism and having a negative pressure lower than an atmospheric pressure outside the cover through exhaust;

a liquid ejector configured to eject a cleaning liquid onto the substrate; and a cleaning unit including a brush configured to bring the brush into contact with at least one surface of the substrate that is being rotated, thereby cleaning the surface of the substrate.

10. A cleaning apparatus comprising:

a plurality of rollers configured to rotate a substrate in contact with an outer periphery of the substrate;

a rotation mechanism including a motor and configured to rotate the rollers about a rotation shaft;

a cover interposed between the rollers and the rotation mechanism to cover the rotation mechanism;

an ejection port provided in the cover and configured to eject gas between the cover and the rollers;

a negative pressure region provided in the cover on a side of the rotation mechanism and having a negative pressure lower than an atmospheric pressure outside the cover through exhaust;

a liquid ejector configured to eject a cleaning liquid onto the substrate;

a cleaning unit including a brush configured to bring the brush into contact with at least one surface of the substrate that is being rotated, thereby cleaning the surface of the substrate;

an exhauster configured to perform exhaustion from the negative pressure region;

a pressure detector configured to detect a pressure in the negative pressure region; and a pressure controller configured to control the exhaust to maintain a negative pressure of a predetermined value in the negative pressure region relative to an outside of the roller according to a detection result obtained by the pressure detector.

* * * * *